United States Patent [19]
Tsujimoto et al.

[11] Patent Number: 5,852,947
[45] Date of Patent: Dec. 29, 1998

[54] MAIN SHAFT GEAR MECHANISM IN A TRANSMISSION FOR A VEHICLE

[75] Inventors: Takashi Tsujimoto, Yokaichi; Mamoru Mizutani, Kuwana, both of Japan

[73] Assignee: NTN Corporation, Osaka-Fu, Japan

[21] Appl. No.: 804,040

[22] Filed: Feb. 24, 1997

[30] Foreign Application Priority Data

Feb. 28, 1996 [JP] Japan .................................... 8-041796
Nov. 28, 1996 [JP] Japan .................................... 8-317958

[51] Int. Cl.$^6$ ............................ F16D 23/06; F16C 33/46; F16C 33/36
[52] U.S. Cl. .................... 74/339; 192/53.34; 192/110 B; 384/572; 384/567
[58] Field of Search .......................... 74/339; 192/53.34, 192/110 B; 384/523, 567, 572

[56] References Cited

U.S. PATENT DOCUMENTS 3,918,778  11/1975  Jacobson et al. .................... 384/523 X
4,185,725   1/1980  Maina ............................. 192/53.34 X
4,830,158   5/1989  Uno et al. ........................... 192/53.34

FOREIGN PATENT DOCUMENTS 61-33298   9/1986  Japan .
62-2860    1/1987  Japan .
5-87132    4/1993  Japan .
6-73440   10/1994  Japan .

Primary Examiner—Allan D. Herrmann
Attorney, Agent, or Firm—Nikaido Marmelstein Murray & Oram LLP

[57] ABSTRACT

A bearing unit A comprises a main shaft gear 1 integrally having a tooth section 1a always meshed with a sub shaft gear 6 at the outer circumference, a pair of inner rings 2 fitted in the outer circumference of the main shaft 5, double-row tapered rollers 3 disposed between the raceway surface of the main shaft gear 1 and that of the inner ring 2, and a pair of cages 4 for respectively retaining each row of tapered rollers 3. The pockets 4a of the cage 4 are unequally pitched, wherein the tapered rollers 3 housed in the pockets 4a are unequally disposed at the circumference.

10 Claims, 8 Drawing Sheets

MAIN SHAFT GEAR MECHANISM IN A TRANSMISSION FOR A VEHICLE

FIELD OF THE INVENTION

The present invention relates to a main gear mechanist in a transmission for a vehicle (automobile, truck, bus, etc.) and its peripheral structure.

BACKGROUND OF THE INVENTION

A transmission for a vehicle has a role by which a smooth and comfortable drive is ensured by converting the engine torque by changing the gear ratio corresponding to the running conditions which may change in a wide range. Generally, various conditions such as an adequate gear ratio, sufficient strength, durability, reliability, high drive transmission efficiency, silence, small size and light weight are required for a transmission.

An example shown in FIG. 12 is a synchronized meshing type transmission. The main shaft 11 and sub shaft 12 are disposed in parallel to each other with an appointed interval retained and rotatably supported in a transmission case (not illustrated). The main shaft 11 is interlocked with the output shaft (drive wheel side), and the sub shaft 12 is interlocked with the input shaft (engine side).

A sub shaft gear 13 is secured integral with the sub shaft 12, and the main shaft gear 16 (concurrently used as a bearing outer ring) is rotatably mounted at the main shaft 11 via a bearing inner ring 14 and needle roller 15. The sub shaft gear 13 is always meshed with the main shaft gear 16. A spline tooth 17 and cone 18 are formed at one side of the main shaft gear 16. A hub 19 is disposed in the vicinity of the end face of the cone 18, and is integrally engaged with the main shaft and linked therewith. A synchronization mechanism 20 intervenes between the hub 19 and cone 18, and a sleeve 21 is spline-connected to the outer circumference of the hub 19 movably in the axial direction.

In the state shown in the same drawing, the main shaft gear 16 idly rotates apart fromn the main shaft 11 upon receiving rotations of the sub shaft gear 13. On the other hand, when the sleeve 21 is caused to move rightward in the axial direction from the state shown in the same drawing, the sleeve 21 is meshed with the spline tooth 17 of the main shaft gear 16 via the synchronization mechanism 20, and the main shaft gear 16 is thus linked with the main shaft 11. Thereby, the rotations of the sub shaft gear 13 are reduced by the main shaft gear 16 at an appointed transmission ratio and are transmitted to the main shaft 11. When changing the transmission ratio, the main shaft gear 16 is caused to rotate synchronously with the main shaft 11 and inner ring 14.

When changing the transmission ratio, by the main shaft gear 16 and inner ring 14 being synchronously rotated, such a state occurs, where a rolling element (needle roller 15) stops on the raceway surfaces of both the main shaft gear 16 and inner ring 14. On the other hand, if a load (vibrations, etc.) repeatedly operates from the outside, slight slips repeatedly occur between the rolling elements and the raceway surface, fretting (slight slips repeatedly occur between the two contacting surfaces to cause them to be worn) is likely to occur.

Conventionally, in order to suppress the fretting, there are types in which the raceway surfaces of the main shaft gear 16 and inner ring 14 and the rolling surface of rolling elements are parkerized (phosphate film coated) and the friction resistance between the rolling elements and raceway surfaces is suppressed. However, there is a possibility that due to a wearing of the parkerizing, a reliable fretting suppression effect can not be expected for a longer period of tine.

SUMMARY OF THE INVENTION

It is therefore an object of the invention to provide a means for preventing fretting of the raceway surfaces of the main shaft gear and bearing inner rings in a transmission, and the rolling surfaces of rolling elements therein for a prolonged period of time.

In order to achieve the above object, the invention is to provide a main shaft gear mechanism comprising a sub shaft interlocked to the input shaft at the engine side of a vehicle, a sub shaft gear arranged on the sub shaft, a main shaft interlocked to the output shaft at the drive wheel side, a main shaft gear integrally having the toothed section always meshed with the sub shaft gear on its outer circumference and having a double-row raceway surface on its inner circumference, a pair of bearing inner rings fitted in the outer circumference of the main shaft and having the respective raceway surfaces on the outer circumference, double row tapered rollers disposed between the double row raceway of the main shaft gear and the raceway surfaces of the pair of bearing inner rings and retained by a cage at an appointed circumferential interval, an unbalancing means for respectively generating a weight unbalance with respect to the assembly consisting of one-row tapered rollers and cage in the circumferential direction, a clutch gear connected to the main shaft gear, and a synchronization mechanism for transmitting or interrupting the engine torque between the main shaft gear and the main shaft via the clutch gear by operations of a selector.

Furthermore, the invention is to provide a bearing unit for supporting a main shaft gear, which comprises a main shaft gear integrally having a toothed section always meshed with a sub shaft gear of a transmission for a vehicle on its outer circumference and having a double-row raceway surface on its inner circumference, a pair of bearing inner rings fitted in the outer circumference of the main shaft and having the respective raceway surfaces on the outer circumference, double row tapered rollers disposed between the double row raceway of the main shaft gear and the raceway surfaces of the pair of bearing inner rings and retained by a cage at an appointed circumferential interval, and an unbalancing means for respectively generating a weight unbalance with respect to the assemblies each consisting of one-row tapered rollers and cage in the circumferential direction.

Even in a case where the main shaft gear and bearing inner ring rotate in synchronization when the transmission is neutral, the fretting can be prevented by providing an unbalancing means by which a weight unbalance is caused at the assembly consisting of a cage and tapered rollers in the circumferential direction since the above assembly makes relative rotations with respect to the inner ring and main shaft gear. Still furthermore, it can be expected that the fretting effect lasts for a longer period of time.

Since the fretting can be prevented for a longer period of time, the durability and service life of a bearing are further improved, and it is possible to reduce the size of the bearing. Therefore, the main shaft and its peripheral parts can be made smaller, and the transmission is able to be further made smaller and made lighter with the durability and reliability maintained.

The abovementioned weight unbalance can be accomplished by unequally arranging tapered rollers in the circumferential direction, or the above weight unbalance can be accomplished by a weight unbalance of the cage in the circumferential direction. The weight unbalance of the cage is able to be achieved by making the shape or thickness of the cage out of uniformity in the circumferential direction. Furthermore, the above weight unbalance can be achieved by making the weight of tapered rollers in the respective rows unequal. Concretely, the weight of at least one of a plurality of the tapered rollers is made different from the weight of the other tapered rollers. That is, there are several ways as the means for making the weights of the tapered rollers, for example, at least one of the tapered rollers is made hollow, the end face of at least one of the tapered rollers is made slightly hollow, or at least one of the tapered rollers is made of a material having a comparatively low specific gravity such as a ceramic, etc.

It is preferable that the size of the abovementioned weight unbalance is made 1 to 20 grams for the radius 50 mm from the axial center,

DESCRIPTION OF PREFERRED EMBODIMENTS

A description is given below of the invention.

Figure 1:
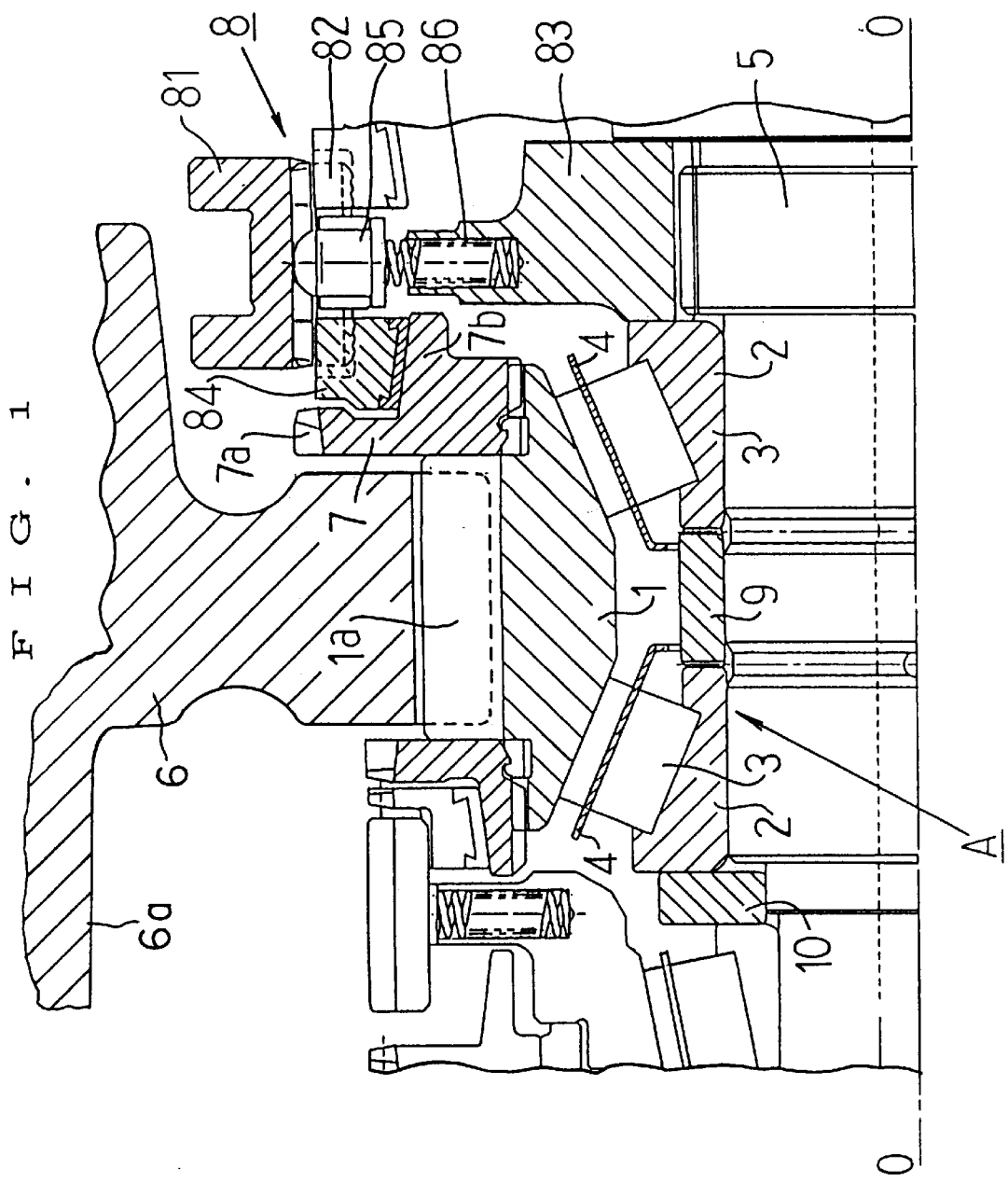
FIG. 1 is a cross-sectional view of the main shaft gear and its peripheries in a transmission.

FIG. 1 shows the peripheries of the main shaft gear 1 in a synchronized meshing type transmission. The main shaft 5 and sub shaft 69 are disposed in parallel to each other at an appointed interval and are rotatably supported at the transmission case (not illustrated). The main shaft 5 is interlocked with the output shaft (not illustrated) at the drive wheel side, and the sub shaft is interlocked with the input shaft (not illustrated) at the engine side.

A sub shaft gear 6 is secured at the sub shaft integrally therewith (or separately therefrom), and the main shaft gear 1 is rotatably mounted at the main shaft 5 via a bearing unit A described later. A toothed section 1a which is always meshed with the sub shaft gear 6 is integrally mounted at the middle part of the outer circumference of the main shaft gear 1, and a clutch gear 7 is engaged with and connected to both the end parts. The clutch gear 7 has a spline tooth 7a at the outer circumference and a cone 7b at one side, and a synchronization mechanism 8 is provided in the vicinity of the clutch gear 7.

The synchronization mechanism 8 is provided with a sleeve 81 which is able to move in the axial direction (the left and right direction in the same drawing) by operation of a selector (not illustrated), a synchronizer key 82 mounted so as to be movable in the axial direction at the inner circumference of the sleeve 81, a hub 83 meshed with and connected to the outer circumference of the main shaft 5, a synchronizer ring 84 slidably mounted at the outer circumference of a cone 7b of the clutch gear 7, a push pin 85 for elastically pressing the synchronizer key 82 to the inner circumference, and a spring 86.

In the state shown in the same drawing, the sleeve 81 and synchronizer key 82 are retained at the neutral position by the push pin 85. At this time, the main shaft gear 1 idly rotates with respect to the main shaft 5 upon receiving rotations of the sub shaft gear 6. On the other hand, in a case where the sleeve 81 moves from the state shown in the same drawing to, for example, the left side in the axial direction by operation of the selector, the synchronizer key 82 follows the sleeve 81 and moves to the left side in the axial direction, thereby causing the synchronizer ring 84 to be pressed to the inclined surface of the cone 7b of the clutch gear 7, whereby although the rotation speed at the clutch gear 7 side is slowed down, the rotation speed at the synchronization mechanism 8 side is increased. Accordingly, the sleeve 81 further moves to the left side in the axial direction around when the rotation speeds at both the clutch gear 7 side and the synchronization mechanism 8 side are synchronized to get meshed with the spline tooth 7a of the clutch gear 7, thereby causing the main shaft gear 1 to be connected to the main shaft 1 via the synchronization mechanism 8. Therefore, the rotations of the sub shaft gear 6 are reduced at an appointed transmission ratio by the main shaft gear 1 and are transmitted to the main shaft 5. At this time, the main shaft gear 1 is caused to rotate in synchronization with the nain shaft 5 and the inner ring 2 of the bearing unit A.

Figure 2A:
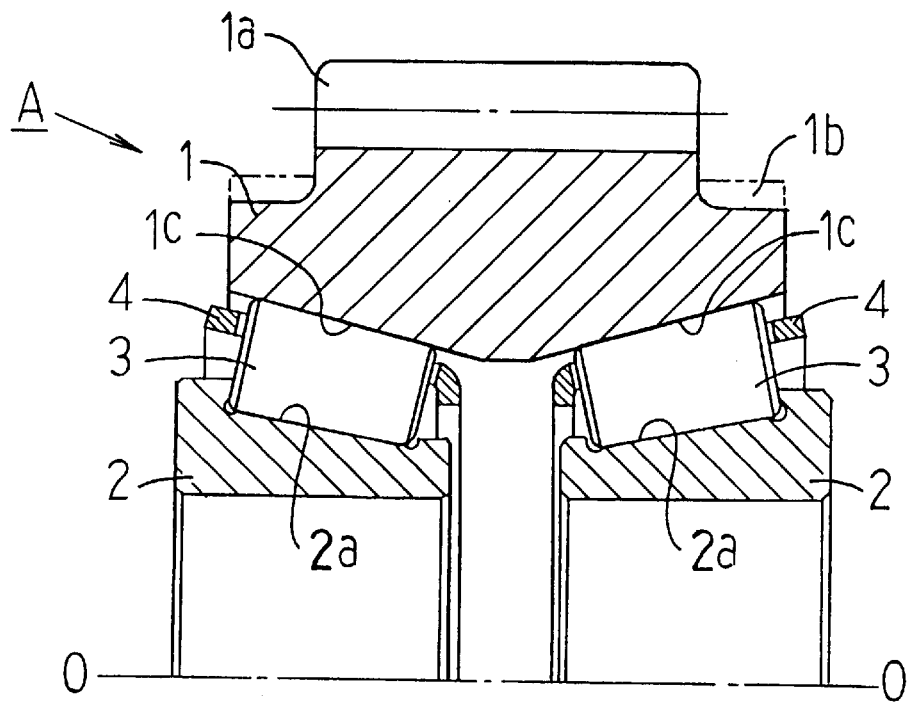
FIG. 2A is a cross-sectional view of a bearing unit A.

In such a transmission for a vehicle as shown above, FIG. 2A shows a bearing unit A by which the main shaft gear 1 is rotatably supported with respect to the main shaft 5. The bearing unit A is equipped with a main shaft gear 1 integrally having at the outer circumference a toothed section 1a always meshed with the sub shaft gear 6 and a toothed section 1b (which is provided in a case where the clutch 7 is connected in the pattern shown in FIG. 1. However, the connection between the main shaft gear 1 and clutch gear 7 is not limited to the pattern shown in FIG. 1) with which the clutch gear 7 is engaged and connected and having a double-row raceway surface 1c on the inner circumference, a pair of inner rings 2 fitted in the outer circumference of the main shaft 5, double-row tapered rollers 3 disposed between the double-row raceway surface 1c of the main shaft gear 1 and the raceway surface 2a of the pair of inner rings 2, and a pair of cages 4 for respectively retaining each row of the tapered rollers 3. When being at the neutral or changing the speed by other main shaft gears, the main shaft gear 1 idly rotates with respect to the inner ring 2 (and main shaft 5). However, when changing the speed by this main shaft gear 1, the main shaft gear 1 rotates in synchronization with the inner ring 2 (and main shaft 5). Furthermore, as shown in FIG. 1, the pair of inner rings 2 of the bearing unit A are fitted in the outer circumference of the main shaft 5 via a spacer 9 and are positioned in the axial direction between the end face of the hub 83 and an end face member 10.

Figure 2B:
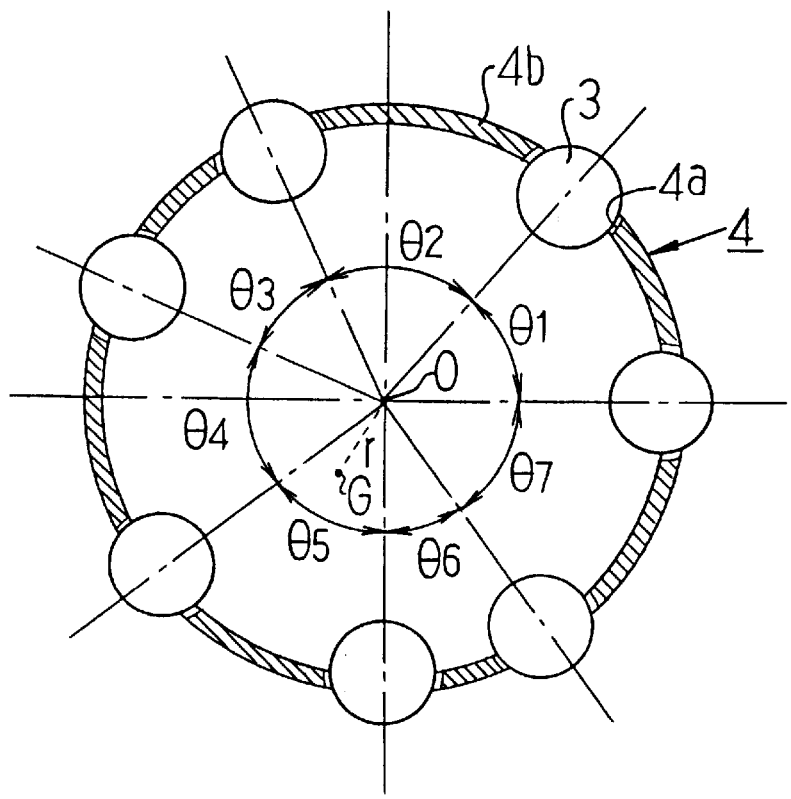
FIG. 2B is a cross-sectional view showing the assembly in which the cage and tapered rollers are incorporated.

As shown in FIG. 2B, in this preferred embodiment, the pockets 4a of the cage 4 are of unequal pitches, wherein tapered rollers 3 housed in the pockets are disposed with unequal intervals at its circumference. Therefore, the center 0 of gravity of the assembly consisting of each cage 4 and the respective rows of tapered rollers 3 is deviated a radius r from the axial center 0, thereby causing a weight unbalance to be produced in the assembly in its circumference direction.

In FIG. 2B, the pitch angle $\theta n$ (n=1 to 7) of the tapered rollers 3 has at least two values, wherein when it is assumed that the weight of a tapered roller 3 is Wr, the weight of the post 4b of the cage 4 is Wcn (n=1 to 7), and the radii at the center of gravity positions from the respective axial center 0 are Rr and Rc, the unbalance m at the position of the radius r is able to be obtained by the following expression.

Figure 3A:
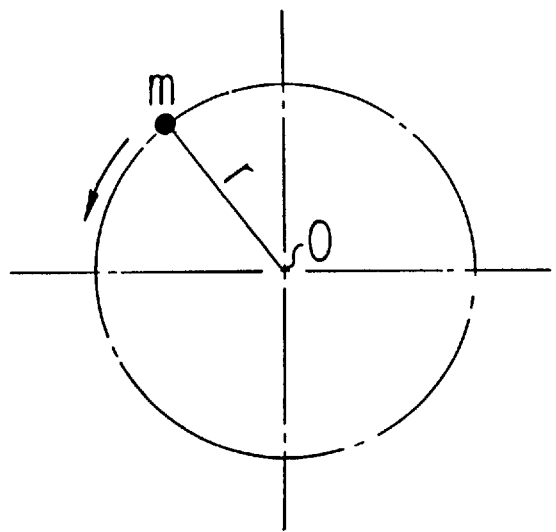
FIGS. 3A and 3B are a conceptional view showing the position of the weight unbalance and the relative rotation direction of the assembly.
Figure 3B:
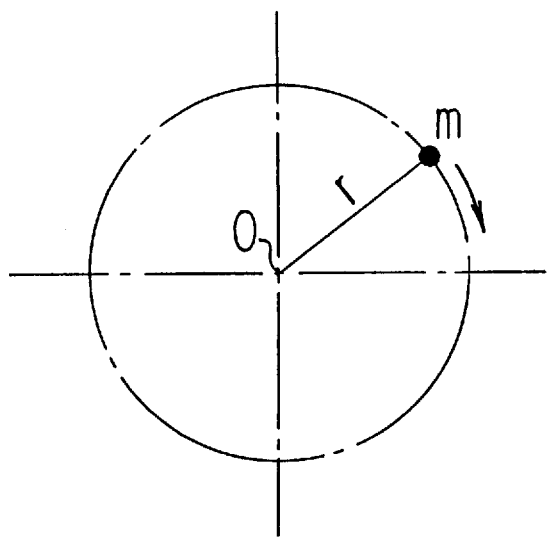

Unbalance $m=(X^2+Y^2)^{1/2}/r$ where $X=Wr \cdot Rr \cdot \Sigma(\cos \alpha n)+Rc \cdot \Sigma(Wcn \cdot \cos \beta n)$
$Y=Wr \cdot Rr \cdot \Sigma(\sin \alpha n)+Rc \cdot \Sigma(Wcn \cdot \sin \beta n)$ $\alpha n=\Sigma(\theta n), \beta n=\Sigma(\theta n-1)+\theta n/2$ When the main shaft gear 1 receives rotations of the sub shaft gear 6 and rotates in synchronization with the inner ring 2 (and the main shaft 5), the position energy of the gravity with respect to the weight unbalance m is converted to dynamic energy, whereby for example, such a force (=m×r) operates, which rotates the abovementioned assembly relative to the main shaft gear 1 and inner ring 2 counterclockwise at the position shown in FIG. 3A and clockwise at the position shown in FIG. 3B. Therefore, since the contact positions of the tapered rollers 3 with the raceway surface 1c of the main shaft gear 1 and with the raceway surface 2a of the inner ring 2 are caused to change, the fretting is prevented from occurring.

Although the unbalance m is adequately established based on the use conditions, etc., it is preferable in this kind of transmission that the unbalance is 1 to 20 grams with regard to a radius 50 mm from the axial center 0. That is, it is effective from the standpoint of preventing the fretting that the unbalance is 50 to 1,000 g·mm as a moment force (m×r).

A comparison test was carried out, wherein a bearing unit A (unequal pitch) according to the above preferred embodiment and a bearing unit as a control (equal pitch: having the same article number as that of the preferred embodiment but not parkerized) are employed. The results are shown in Table 1. Furthermore, the test was carried out in such a manner that the inner ring of a bearing to be tested is caused to rotate in synchronization with the main shaft gear thereof in a condition where the radial load Fr is 500 kgf, the thrust load Fa is 350 kgf and the number of revolutions is 1,600 rpm and the wearing quantity of the raceway surface of the inner ring and main shaft gear was measured after twenty-four testing hours.

As has been made clear from the test results, the bearing unit according to the preferred embodiment, to which a weight unbalance is applied, is remarkably less worn due to the fretting in comparison with the bearing unit not having any weight unbalance. Especially, in a case where the weight unbalance is 1.5 grams (corresponding to a radius 50 mm from the axial center), the lowering of the wearing is remarkable.

Figure 4A:
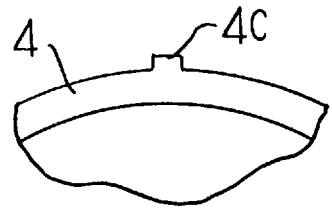
FIGS. 4A and 4B respectively are a front elevational view and a rear view showing a part of the cage.
Figure 4B:
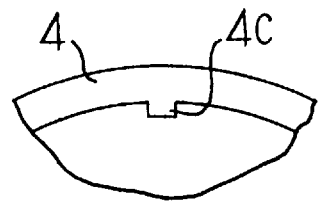
Figure 5A:
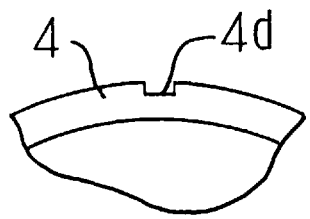
FIGS. 5 and 5B respectively are a front elevational view and a rear view showing a part of the cage.
Figure 5B:
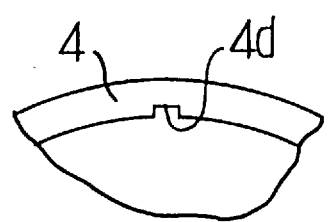
Figure 6:
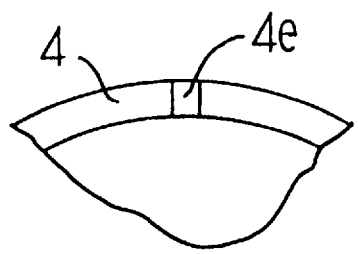
FIG. 6 is a front elevational view and a rear view showing a part of the cage.

Hereupon, in a cage 4 having unequal pitched pockets 4a as shown above, it is preferable in view of the assembling process that the angular position which will be the reference is clearly understood (With this kind of tapered roller bearings, since the tapered rollers are retained by caulking the cage and the caulking mold is shaped so that the same is adequate for the tapered roller pitch, it is necessary to align the phases in the cage and caulking mold). Preferred embodiments shown in FIGS. 4A to FIG. 6 are provided with an identification mark which expresses the angular reference position of a cage 4. The preferred embodiment shown in FIGS. 4A and 4B is provided with a projection 4c at the outer circumference of the reference position at the large-diametered side or small-diametered side of the cage 4 (See FIG. 4A), and provided with a projection 4c at the inner circumference of the reference position (See FIG. 4B), and preferred embodiment shown in FIGS. 5A and 5B is provided with a a notched part 4d at the outer circumference of the reference position at the large-diametered side or small-diametered side (See FIG. 5A), and provided with a notched part 4d at the inner circumference of the reference position (See FIG. 5B), and the preferred embodiment shown in FIG. 6 is provided with a notched part 4e (a projection may be acceptable) at the end face of the reference position at the large-diametered side or small-diametered side of the cage 4.

Figure 7A:
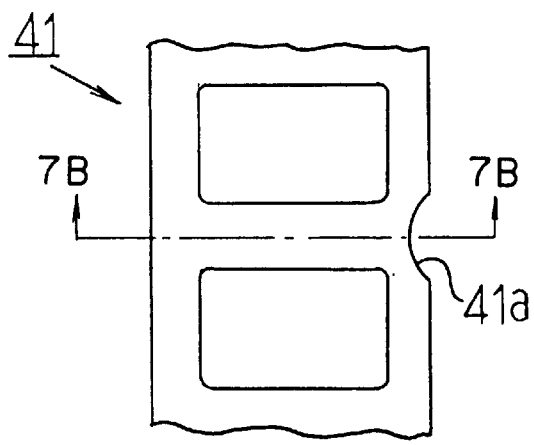
FIG. 7A is a plan view showing a part of a cage according to another preferred embodiment.
Figure 7B:
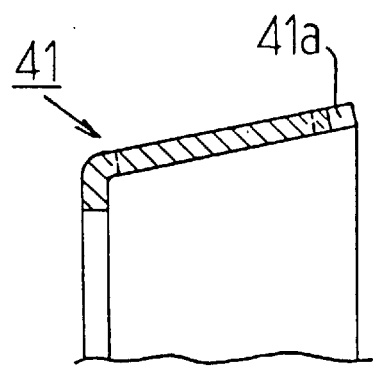
FIG. 7B is a cross-sectional view taken along the line 7B—7B in FIG. 7A.
Figure 8A:
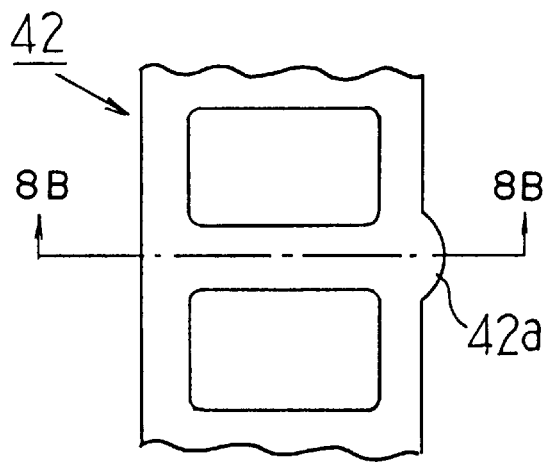
FIG. 8A is a plan view showing a part of a cage according to still another preferred embodiment.
Figure 8B:
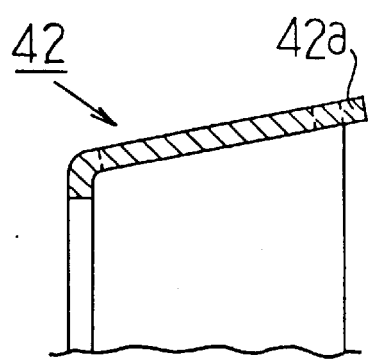
FIG. 8B is a cross-sectional view taken along the line 8B—8B in FIG. 8A.

Preferred embodiments shown in FIGS. 7A, 7B, 8A, and 8B are provided with a weight unbalance in the circumferential direction of the cage. Since the cage has a weight unbalance, the center of gravity of the assembly consisting of the cage and tapered rollers is deviated from the axial center to cause the assembly to have a weight unbalance in the circumferential direction. FIGS. 7A and 7B show a construction in which a notched part 41a is provided at one or more points at the large-diametered side of the cage 41, FIG. 8 shows a construction in which a projection 42a at one or more points at the large-diametered side of the cage 42. Despite the projections 4c and notched parts 4d,4e shown in FIGS. 4A to FIG. 6 not substantially producing any weight unbalance, the notched part 41a and projection 42a herein are provided to substantially produce a weight unbalance. However, the notched part 41a and projection 42a are also utilized as an identification mark. Furthermore, the notched part 41a and projection 42a may be provided at only the small-diametered side of the cage 42 or at both the small-diametered side and the large-diametered side.

Figure 9:
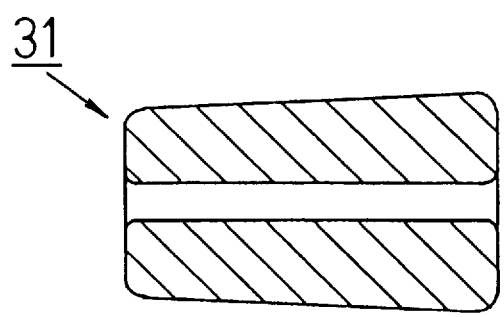
FIG. 9 is a cross-sectional view of a tapered roller according to further another preferred embodiment.
Figure 10:
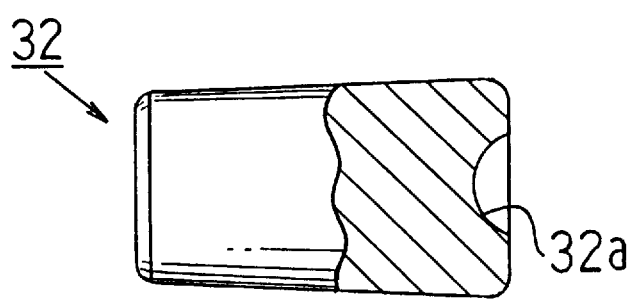
FIG. 10 is a cross-sectional view of a tapered roller according to further another preferred embodiment.

Preferred embodiments shown in FIGS. 9 and 10 are such that the weight of tapered rollers in the respective rows are made unequal. Due to the weight of the tapered rollers being unequal, the center of gravity of the assembly consisting of the cage and tapered rollers is deviated from the axial center to cause the assembly to have a weight unbalance in the circumferential direction. FIG. 9 shows a construction in which at least one of the tapered rollers 31 is made hollow, and FIG. 10 shows a construction in which the larger end face of at least one tapered roller 32 is provided with a relief 32a (the relief 32a may be secured at only the smaller end face or at both the smaller and larger end faces).

Figure 11:
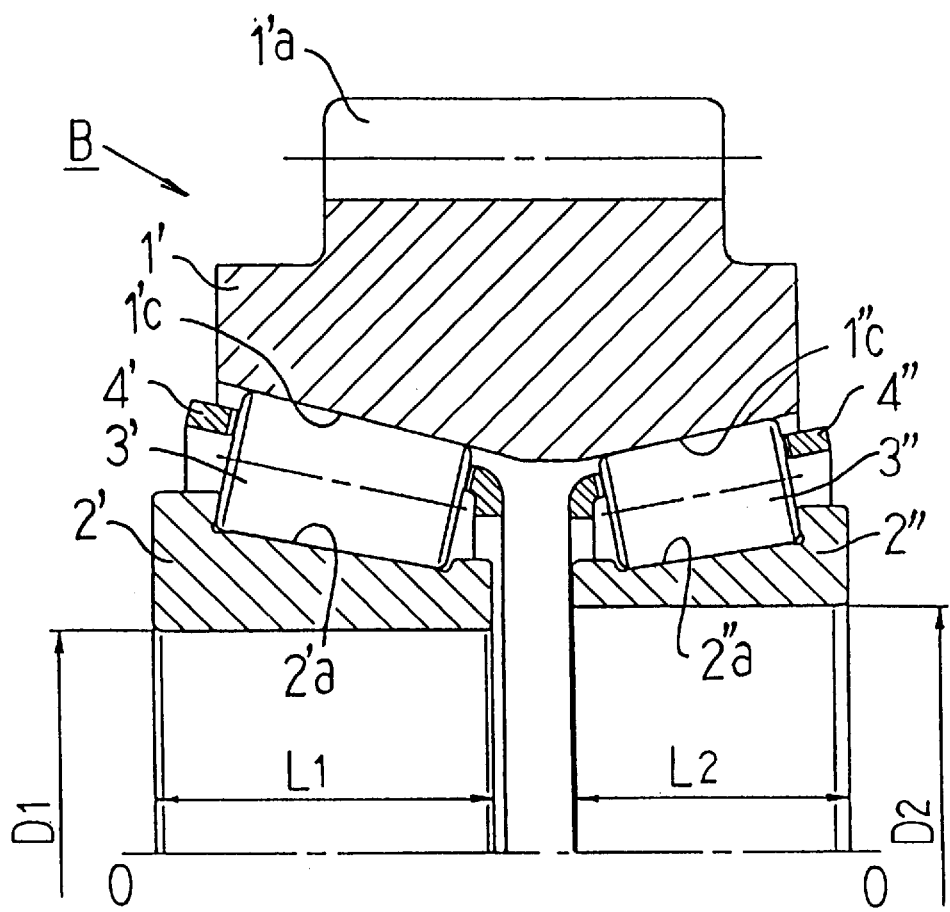
FIG. 11 is a cross-sectional view of a bearing unit B according to the other preferred embodiment.
Figure 12:
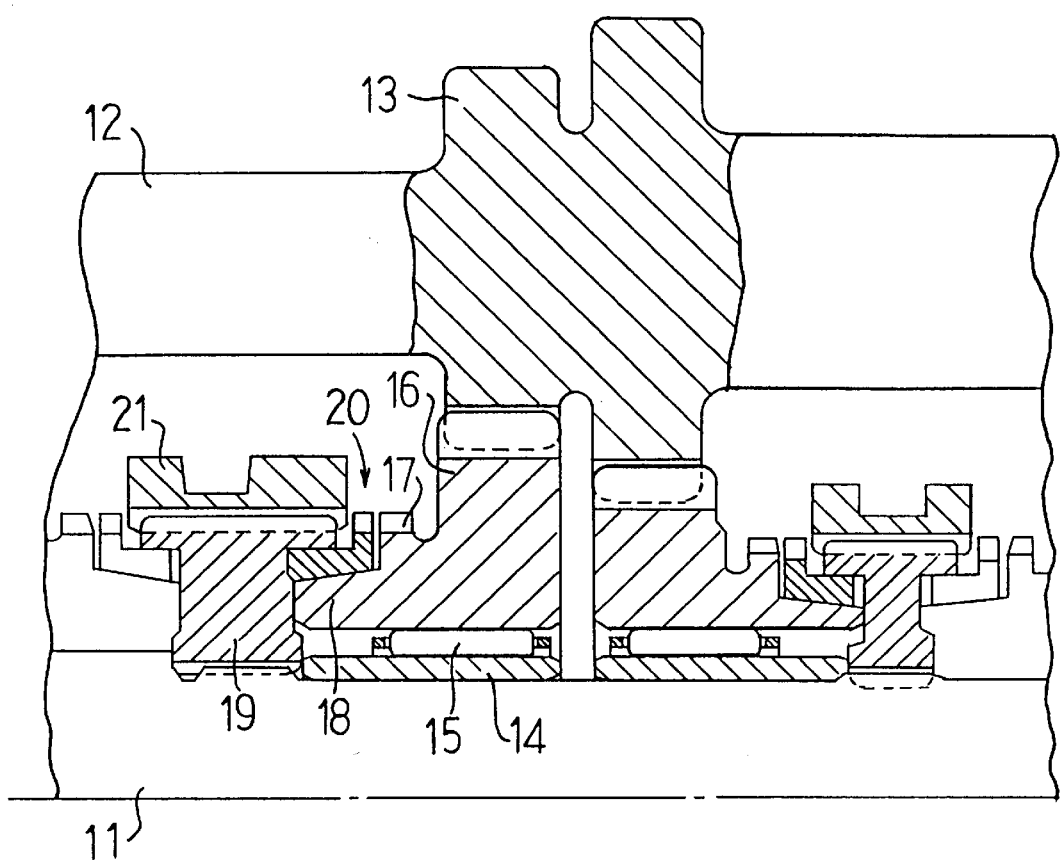
FIG. 12 is a cross-sectional view showing a conventional example of a synchronized meshing type transmission.

A bearing unit B shown in FIG. 11 is such that the left and right directions L1,L2 in the axial direction of the bearing part and inner dimensions D1,D2 are made different from each other (that is, L1–L2, D1–D2). This is taken into consideration in view of the layout in a transmission case and a difference of the axial load to be applied (Generally, the axial load is applied to only one side). In this preferred embodiment, since L1 is the width dimension of the left side (engine side) inner ring 2' in the axial direction in the same drawing, L2 is the width dimension of the right side (drive wheel side) inner ring 2" min the same drawing, the dimension of the raceway surfaces 2'a, 2"a in the axial direction, dimensions of the left and right tapered rollers 3', 3" in the axial direction and dimensions of the left and right raceway surfaces 1'C, 1"C of the main shaft gear 1' in the axial direction are respectively determined to mutually different dimensions corresponding to the ratios of the L1 and L2. Furthermore, based on the layout and load pattern of the axial load, (L1–L2, D1–D2), (L1–L2, D1–D2) or (L1–L2, D1–D2) may be employed. The other construction is subject to the constructions of the abovementioned bearing unit A.

TABLE 1

| Bearing to be tested | Maximum wearing amount of the raceway surface ($\mu$m) |
| --- | --- |
| Article according to the preferred embodiment: Weight unbalance = 0.75 grams | 3 |
| Article according to the preferred embodiment: Weight unbalance = 1.5 grams | 1 |
| Control article: No weight unbalance provided | 5 |

The weight unbalance is a value corresponding to a radius 50 mm from the axial center.

What is claimed is:

1. A main shaft gear mechanism in a transmission for a vehicle comprising:
    a sub shaft adapted to be interlocked with an engine side input shaft for a vehicle;
    a sub shaft gear attached to said sub shaft;
    a main shaft adapted to be interlocked with a drive wheel side output shaft;
    a main shaft gear integrally having a tooth section always meshed with said sub shaft gear and having a double row raceway surface at the inner circumference thereto;
    a pair of bearing inner rings being fitted in the outer circumference of said main shaft and respectively having a raceway surface on the outer circumference thereof;
    double-row tapered rollers being disposed between the double-row raceway surface of said main shaft gear and the raceway surface of said pair of bearing inner rings and being retained by a cage at an appointed interval of the circumference;
    an unbalancing means for causing an assembly consisting of each row of rollers and said cage to be weight-unbalanced;
    a clutch gear connected to said main shaft gear; and
    a synchronization mechanism for transmitting or interrupting engine torque between said main shaft gear and said main shaft via said clutch gear.

2. A main shaft gear as set forth in claim 1, wherein said unbalancing means has tapered rollers unequally disposed at the circumference.

3. A main shaft gear mechanism in a transmission for a vehicle as set forth in claim 1, wherein said unbalancing means is a weight unbalance of a cage for retaining tapered rollers in the circumferential direction.

4. A main shaft gear mechanism in a transmission for a vehicle as set forth in claim 1, wherein said unbalancing means is achieved by unequal weight distribution of tapered rollers in each row.

5. A main shaft gear mechanism in a transmission for a vehicle as set forth in claim 1, wherein said weight unbalance is one to twenty grams for a radius 50 mm from the axial center.

6. A main shaft gear mechanism in a transmission for a vehicle comprising:
    a main shaft gear having a tooth section always meshed with a sub shaft gear of a transmission for a vehicle at the outer circumference and having a double-row raceway surface at the inner circumference;
    a pair of bearing inner rings being fitted in the outer circumference of said main shaft and respectively having a raceway surface on the outer circumference thereof;
    double-row tapered rollers being disposed between the double-row raceway surface of said main shaft gear and the raceway surface of said pair of bearing inner rings and being retained by a cage at an appointed interval of the circumference; and
    an unbalancing means for causing an assembly consisting of each row of rollers and said cage to be weight-unbalanced.

7. A bearing unit for supporting a main shaft gear in a transmission for a vehicle as set forth in claim 6, wherein said unbalancing means has tapered rollers unequally disposed at the circumference.

8. A bearing unit for supporting a main shaft gear in a transmission for a vehicle as set forth in claim 6, wherein said unbalancing means is a weight unbalance of a cage for retaining tapered rollers in the circumferential direction.

9. A bearing unit for supporting a main shaft gear in a transmission for a vehicle as set forth in claim 6, wherein said unbalancing means is achieved by unequal weight distribution of tapered rollers in each row.

10. A main shaft gear mechanism in a transmission for a vehicle as set forth in claim 6, wherein said weight unbalance is one to twenty grams for a radius 50 mm from the axial center.

* * * * *